June 1, 1948.   S. M. KASS   2,442,496
NOZZLE ADAPTOR FOR FAUCETS AND THE LIKE
Filed Oct. 19, 1946
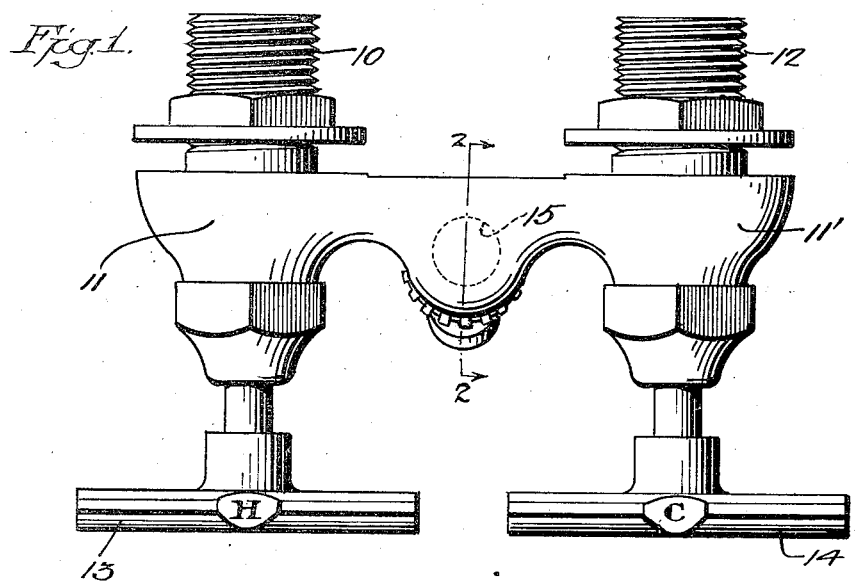
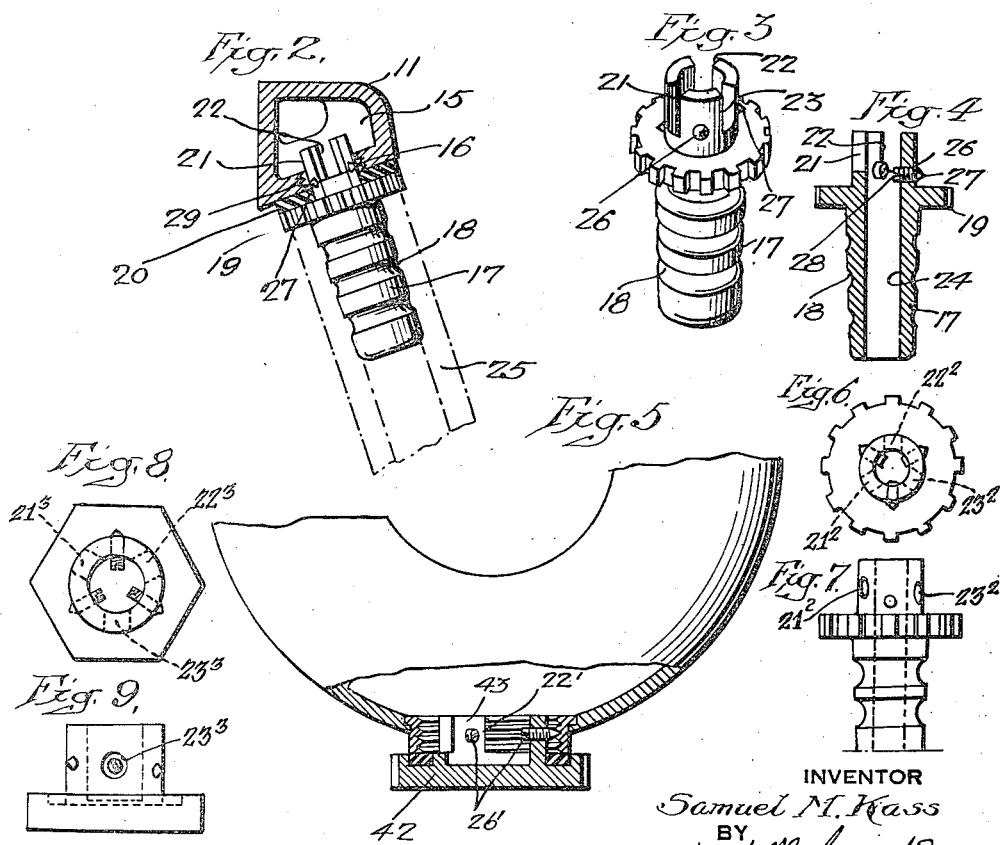
INVENTOR
Samuel M. Kass
BY Wm. Steel Jackson and Son.
ATTORNEYS Patented June 1, 1948

2,442,496

UNITED STATES PATENT OFFICE 2,442,496

NOZZLE ADAPTOR FOR FAUCETS AND THE LIKE

Samuel M. Kass, Philadelphia, Pa.

Application October 19, 1946, Serial No. 704,321

4 Claims. (Cl. 285—145)

1

My invention relates to screw plug adaptors for faucets or plumbing fixtures.

The main purpose of my invention is to provide an adaptor plug which can be fitted into plumbing fixtures.

A further purpose is to provide a plumbing adaptor and to make threaded connection between the adaptor and the fixture.

A further purpose is to supply a plumbing fixture with an adaptor nozzle to which a hose or flexible connection can be secured.

A further purpose is to place adjustable threaded points in helical formation upon one end of a plug of an adaptor nozzle.

A further purpose is to supply intermediate helically arranged adjustable projections within an adaptor to cooperate and hold an adaptor in place by means of the connection made between the points and the threads of a plumbing fixture.

Further purposes will appear in the specification and in the claims.

Referring to the drawings:

Figure 1 is a top plan view of a hot and cold water faucet showing my adaptor in place.

Figure 2 is a transverse section taken on the line 2—2 of Figure 1.

Figure 3 is a perspective view of my improved adaptor nozzle.

Figure 4 is a vertical section of my adaptor nozzle.

Figure 5 is a fragmentary side elevation, partly in section, showing my invention as applied to a plug for traps.

Figure 6 is a top plan view of a modified form of Figures 1-4 inclusive.

Figure 7 is a vertical front elevation of Figure 6.

Figure 8 is a top plan view of a modified form of the adaptor shown in Figure 5.

Figure 9 is a vertical front elevation of Figure 8.

In Figure 1, I have illustrated my adaptor nozzle as applied to a hot and cold water faucet. The faucet is of the double type in which hot water flows in through a connection 10 to a faucet 11 and cold water flows into a faucet 11' through a connection 12. The water is controlled by means of handles 13 and 14. In the customary valve control shown, the water eventually flows through an opening 15 in the valve port.

These valves are of the type shown at 11 and 11' and are usually supplied with a threaded opening 16 through which water may pass to flow into a tub or washstand placed below the faucet.

It is my intention to apply an adaptor unit to the valve at the opening 16 by means of adjustable pointed set screws cooperating with threads

2 in the faucet, to secure the adaptor to the valve body.

In the forms of Figures 1 to 4 inclusive I have preferred to illustrate my invention by selecting the usual type of hose adaptor 17 grooved at 18 to which adaptor the rubber hose may be attached. The adaptor is circumferentially knurled at 19 for hand gripping purposes. A gasket 20 is placed about the sleeve extension to prevent undue leakage. The upwardly extending sleeve 21 is vertically slotted at 22.

The adaptor is provided with a longitudinal opening 24 through which the water will pass to enter the hose 25. This hose is illustrated by dot and dash lines in Figure 2.

It will be noted that the sleeve 21 at its uncut portions carries set screws 26. These set screws are shaped to form pins 27 at their outer ends. The inner ends of the set screws are provided with slots 28 into which a tool may be inserted to adjust the screws into any desired position. Due to the slotting of the sleeve at 22, it will be possible to insert a screw driver through any one of the slots to make engagement with the set screw opposite for proper adjustments.

The set screws are arranged in helical formation about the sleeve in order that the set screws will match with the threads within a faucet outlet. Many times I have found that the openings in the faucet are of different diameters. It is my desire to provide an adaptor which can be used on many sizes of openings on any faucet. The pin ends 27 will engage within the helical thread 29 within the faucet nozzle.

In the event that the nozzle does not carry a thread I have found that without too much difficulty a thread may be tapped in the nozzle opening.

By the use of my adaptor I have found that this very simple form of attachment makes it possible to supply one adaptor nozzle for many different sizes of openings in faucets. Previously it has been necessary for a purchaser to buy a certain size adaptor to fit within a certain size opening. My adaptor takes care of many different sizes of openings and provides a convenient attachment for using a hose.

I have found that the principle of inserting set screws through a vertically slotted projecting sleeve, as shown in Figures 1 to 4 inclusive, is useful for other plumbing fixtures. I have therefore shown a plug 42 having a sleeve extension 43 with slots 22' vertically arranged about the circumference of the sleeve. The uninterrupted part of the sleeve carries set screws 26' similar to those in the figures mentioned above.

The plug 42 is recessed at 43 to receive packing 14, which acts as a seal against any insert 45 fastened into the bottom of a trap 46. The insert 45 is interiorly threaded at 47 and the pins 27' of the set screws 26' are adapted to enter into and cooperate with the threads within the insert.

The plug is knurled at 47 for easy removal.

The adaptor shown in Figures 6 and 7, is identical with the adaptor shown in the form of Figures 1–4 inclusive, excepting that instead of the slots 21, 22 and 23 I have provided circular openings $21^2$, $22^2$, and $23^2$. These apertures are helically arranged in order that a tool may be placed in the aperture to allow for manipulation of the set screws 26 for proper adjustment. In all other respects the adaptor is the same as shown in the above mentioned figures.

In Figures 8 and 9, I have shown the plug adaptor with openings $21^3$, $22^3$, and $23^3$. In all other respects the structure is the same as shown in the adaptor of Figure 5.

In view of my invention and disclosure variations and modifications to meet individual whim or particular need will doubtless become evident to others skilled in the art, to obtain all or part of the benefits of my invention without copying the structure shown, and I, therefore claim all such insofar as they fall within the reasonable spirit and scope of my claims.

Having thus described my invention what I claim as new and desire to secure by Letters Patent is:

1. A plumbing fitting adjustably adapted to be joined to any one of several different-sized interiorly-threaded openings in other fittings, which includes a joint-sealing portion adapted to fit tightly to the other fitting at or around the entire edge of its opening, a body portion adapted to hold the joint-sealing portion against the other fitting when the fittings are joined together, and screws having point ends in interiorly-threaded holes in the body portion with the holes and the screws adapted to permit the point ends of the screws to be adjustably positioned and used to ride in the interior threads of any of the several different-sized openings, thus permitting screwing the adjustable fitting into joined position with the particular other fitting.

2. A plumbing adaptor having projections adapted to extend into a threaded opening with recesses between the projections, and radially outwardly extending adjustable screws in the projections accessible for adjustment through the recesses.

3. A plumbing adaptor having projections adapted to extend into a threaded opening with recesses between the projections, and radially outwardly extending adjustable screws in the projections conforming to a helical path, accessible for adjustment through the recesses.

4. A plumbing adaptor having a projecting member and radially outwardly extending screws in holes in the projecting member, which holes conform to a helical path.

SAMUEL M. KASS.